(12) United States Patent
Jones et al.

(10) Patent No.: US 12,465,742 B2
(45) Date of Patent: Nov. 11, 2025

(54) BREAKAWAY CONNECTOR

(71) Applicant: Site Saver, Inc., Fayetteville, AR (US)

(72) Inventors: Spencer A. Jones, Conway, AR (US);
Vance Clement, Fayetteville, AR (US);
Will Armstrong, Fayetteville, AR (US)

(73) Assignee: Site Saver, Inc., Fayetteville, AR (US)

( * ) Notice: Subject to any disclaimer, the term of this patent is extended or adjusted under 35 U.S.C. 154(b) by 725 days.

(21) Appl. No.: 17/884,391

(22) Filed: Aug. 9, 2022

(65) Prior Publication Data

US 2023/0040378 A1 Feb. 9, 2023

Related U.S. Application Data

(60) Provisional application No. 63/231,020, filed on Aug. 9, 2021.

(51) Int. Cl.
*A61M 39/26* (2006.01)
*A61M 39/10* (2006.01)
(Continued)

(52) U.S. Cl.
CPC .......... *A61M 39/146* (2013.01); *A61M 39/24* (2013.01); *A61M 2039/1005* (2013.01);
(Continued)

(58) Field of Classification Search
CPC ............ A61M 2039/1061; A61M 3/26; A61M 2039/1005
See application file for complete search history.

(56) References Cited

U.S. PATENT DOCUMENTS 3,794,057 A 2/1974 Badger
3,797,510 A 3/1974 Torres et al.
(Continued)

FOREIGN PATENT DOCUMENTS

CN 1829551 9/2006
CN 102481445 5/2012
(Continued)

OTHER PUBLICATIONS

International Search Report and Written Opinion issued in related Application Serial No. PCT/US2024/011602 on Jul. 16, 2024.
(Continued)

*Primary Examiner* — Courtney B Fredrickson
(74) *Attorney, Agent, or Firm* — Holland & Knight LLP; Matthew C. Cox

(57) ABSTRACT

A breakaway connector apparatus including a housing and a breakaway component is configured for attachment directly to a needle-free fitting on an intravenous line. The breakaway connector apparatus includes only one valve. The apparatus is configured to open both the valve and a seal on the needle-free fitting when the breakaway component is attached to the needle-free fitting. When tension is applied to the connector, the breakaway component is configured to detach from the apparatus while remaining attached to the needle-free fitting, thereby closing the valve on the apparatus and also closing the seal on the needle-free fitting. In some embodiments, the breakaway connector apparatus includes one or more securing arms and one or more corresponding securing bars to prevent re-connection of the apparatus following disengagement of the breakaway component from the apparatus.

17 Claims, 15 Drawing Sheets

(51) Int. Cl.
  *A61M 39/14* (2006.01)
  *A61M 39/24* (2006.01)
(52) U.S. Cl.
  CPC ............... *A61M 2039/1061* (2013.01); *A61M 2039/1072* (2013.01); *A61M 2205/581* (2013.01); *A61M 2205/587* (2013.01); *A61M 2205/8206* (2013.01)

(56) References Cited

U.S. PATENT DOCUMENTS

| | | | |
|---|---|---|---|
| 3,921,656 A | 11/1975 | Meisenheimer, Jr. et al. | |
| 4,340,049 A | 7/1982 | Munsch | |
| 4,386,622 A | 6/1983 | Munsch | |
| 4,614,201 A | 9/1986 | King | |
| 4,722,725 A | 2/1988 | Sawyer et al. | |
| 4,827,977 A | 5/1989 | Fink, Jr. | |
| 4,872,471 A | 10/1989 | Schneider | |
| 5,070,905 A | 12/1991 | Paradis | |
| 5,190,067 A | 3/1993 | Paradis | |
| 5,215,538 A | 6/1993 | Larkin | |
| 5,320,390 A | 6/1994 | Kodama et al. | |
| 5,357,998 A | 10/1994 | Abrams | |
| 5,364,371 A | 11/1994 | Kamen | |
| 5,405,336 A | 4/1995 | Austin et al. | |
| 5,405,339 A | 4/1995 | Kohnen et al. | |
| 5,465,938 A | 11/1995 | Werge | |
| 5,492,147 A | 2/1996 | Challender et al. | |
| 5,535,785 A | 7/1996 | Werge | |
| 5,775,671 A | 7/1998 | Cote, Sr. | |
| 5,820,614 A | 10/1998 | Erskine et al. | |
| 5,848,997 A | 12/1998 | Erskine et al. | |
| 5,863,425 A | 1/1999 | Herlehy | |
| 5,954,313 A | 9/1999 | Ryan | |
| 6,039,302 A | 3/2000 | Cote, Sr. | |
| 6,146,374 A | 11/2000 | Erskine et al. | |
| 6,546,947 B2 | 4/2003 | Abrams | |
| 6,585,229 B2 | 7/2003 | Cote, Sr. | |
| 6,655,655 B1 | 12/2003 | Matkovich et al. | |
| 6,755,391 B2 | 6/2004 | Newton | |
| 6,869,426 B2 | 3/2005 | Ganem | |
| 6,883,778 B1 | 4/2005 | Newton | |
| 6,892,998 B2 | 5/2005 | Newton | |
| 7,014,169 B2 | 3/2006 | Newton | |
| 7,100,890 B2 | 9/2006 | Cote, Sr. | |
| 7,153,296 B2 | 12/2006 | Mitchell | |
| 7,357,792 B2 | 4/2008 | Newton | |
| 7,396,348 B2 | 7/2008 | Newton | |
| 7,753,892 B2 | 7/2010 | Newton | |
| 7,766,039 B2 | 8/2010 | Zuck | |
| 7,789,864 B2 | 9/2010 | Cote, Sr. | |
| 7,815,168 B2 | 10/2010 | Vangsness | |
| 7,837,658 B2 | 11/2010 | Cote, Sr. | |
| 7,857,284 B2 | 12/2010 | Kimball | |
| 7,879,012 B2 | 2/2011 | Kane | |
| 7,887,519 B2 | 2/2011 | Cote, Sr. | |
| 7,914,502 B2 | 3/2011 | Newton | |
| D636,079 S | 4/2011 | Leypold et al. | |
| 7,955,317 B2 | 6/2011 | Fournie | |
| 7,959,192 B2 | 6/2011 | Elton et al. | |
| 7,975,722 B2 | 7/2011 | Kiehne | |
| 8,002,755 B2 | 8/2011 | Vangsness | |
| 8,100,868 B2 | 1/2012 | Newton | |
| 8,100,869 B2 | 1/2012 | Vangsness | |
| 8,211,069 B2 | 7/2012 | Fangrow, Jr. | |
| 8,454,579 B2 | 6/2013 | Fangrow, Jr. | |
| 8,529,524 B2 | 9/2013 | Newton | |
| 8,568,371 B2 | 10/2013 | Siopes | |
| 8,790,327 B2 | 7/2014 | Takemoto | |
| 8,795,256 B1 | 8/2014 | Smith | |
| 8,876,784 B2 | 11/2014 | Cote, Sr. | |
| 8,968,261 B2 | 3/2015 | Kimball | |
| 8,974,437 B2 | 3/2015 | Williams et al. | |
| 9,138,572 B2 | 9/2015 | Zeytoonian | |
| D750,236 S | 2/2016 | Maurice | |
| 9,259,565 B2 | 2/2016 | Siopes | |
| D757,260 S | 5/2016 | Lombardi, III et al. | |
| D773,659 S | 12/2016 | Cain et al. | |
| 9,604,047 B2 | 3/2017 | Newton | |
| D784,529 S | 4/2017 | Steele et al. | |
| D792,586 S | 7/2017 | Becker | |
| D799,032 S | 10/2017 | Becker | |
| 9,849,274 B2 | 12/2017 | Siopes | |
| 9,861,805 B2 | 1/2018 | Dennis et al. | |
| D825,746 S | 8/2018 | Davis et al. | |
| D830,523 S | 10/2018 | Vranish | |
| D830,524 S | 10/2018 | Vranish | |
| D836,191 S | 12/2018 | Kheradpir et al. | |
| D837,978 S | 1/2019 | Pappalrado | |
| D851,759 S | 6/2019 | Jones | |
| 10,655,768 B2 | 5/2020 | Jones et al. | |
| 10,864,362 B2 | 12/2020 | Jones et al. | |
| 11,291,822 B2 | 4/2022 | Jones et al. | |
| 2001/0042850 A1 | 11/2001 | Cote, Sr. | |
| 2002/0002351 A1 | 1/2002 | Cote, Sr. | |
| 2002/0153503 A1 | 10/2002 | Newton | |
| 2003/0050610 A1 | 3/2003 | Newton | |
| 2003/0085372 A1 | 5/2003 | Newton | |
| 2003/0093061 A1 | 5/2003 | Ganem | |
| 2004/0133171 A1 | 7/2004 | Newton | |
| 2004/0138626 A1 | 7/2004 | Cote, Sr. | |
| 2004/0206924 A1 | 10/2004 | Newton | |
| 2005/0015075 A1 | 1/2005 | Wright et al. | |
| 2005/0038397 A1 | 2/2005 | Newton | |
| 2005/0087715 A1 | 4/2005 | Doyle | |
| 2005/0101939 A1 | 5/2005 | Mitchell | |
| 2005/0165365 A1 | 7/2005 | Newton | |
| 2006/0089605 A1 | 4/2006 | Fitzgerald | |
| 2006/0129109 A1 | 6/2006 | Shaw et al. | |
| 2006/0264841 A1 | 11/2006 | Cote, Sr. | |
| 2006/0293629 A1 | 12/2006 | Cote, Sr. | |
| 2007/0066965 A1 | 3/2007 | Coambs et al. | |
| 2007/0235674 A1 | 10/2007 | Vangsness | |
| 2007/0235675 A1 | 10/2007 | Kimball | |
| 2007/0235676 A1 | 10/2007 | Vangsness | |
| 2007/0238337 A1 | 10/2007 | Kimball | |
| 2007/0255229 A1 | 11/2007 | Kane | |
| 2008/0039802 A1 | 2/2008 | Vangsness | |
| 2008/0197626 A1 | 8/2008 | Coambs et al. | |
| 2009/0200796 A1 | 8/2009 | Lai | |
| 2009/0209922 A1 | 8/2009 | Boisjoly | |
| 2010/0249723 A1 | 9/2010 | Fangrow, Jr. | |
| 2010/0249724 A1 | 9/2010 | Cote, Sr. | |
| 2010/0249725 A1 | 9/2010 | Cote, Sr. | |
| 2010/0286596 A1 | 11/2010 | Hofmann et al. | |
| 2011/0028915 A1 | 2/2011 | Siopes | |
| 2011/0046573 A1 | 2/2011 | Newton | |
| 2011/0066119 A1 | 3/2011 | Cote, Sr. | |
| 2011/0319859 A1 | 12/2011 | Zeytoonian | |
| 2012/0068457 A1 | 3/2012 | Pisula, Jr. | |
| 2012/0157933 A1 | 6/2012 | Newton | |
| 2013/0030387 A1 | 1/2013 | Williams et al. | |
| 2013/0331800 A1 | 12/2013 | Newton | |
| 2014/0031765 A1 | 1/2014 | Siopes | |
| 2014/0128775 A1 | 5/2014 | Andreae et al. | |
| 2014/0180210 A1 | 6/2014 | Niklaus et al. | |
| 2015/0157849 A1 | 6/2015 | Phillips et al. | |
| 2016/0114147 A1 | 4/2016 | Siopes | |
| 2017/0000999 A1 | 1/2017 | Dennis et al. | |
| 2017/0036007 A1 | 2/2017 | Hallisey et al. | |
| 2017/0067586 A1 | 3/2017 | Jones et al. | |
| 2018/0093086 A1 | 4/2018 | Siopes | |
| 2019/0224468 A1 | 7/2019 | Jones et al. | |
| 2020/0323734 A1 | 10/2020 | Ueda et al. | |
| 2021/0236794 A1 | 8/2021 | Jones et al. | |

FOREIGN PATENT DOCUMENTS

| | | |
|---|---|---|
| EP | 2736584 | 1/2013 |
| JP | 2017209149 | 11/2017 |
| KR | 10-2007-0086944 A | 8/2007 |
| WO | 2005/004974 | 1/2005 |
| WO | 2006/122406 | 11/2006 |
| WO | 2007/097985 | 8/2007 |

(56) References Cited

FOREIGN PATENT DOCUMENTS

| WO | 2008/054699 | 5/2008 |
|----|-------------|--------|
| WO | 2013/016623 | 1/2013 |
| WO | 2014/125245 | 8/2014 |
| WO | 2016/210300 | 12/2016 |
| WO | 2023278470 A1 | 1/2023 |

OTHER PUBLICATIONS

Extended International Search Report and Written Opinion issued in the related Application Serial No. PCT/US2022/039869 on Apr. 1, 2025.
International Search Report and Written Opinion for PCT/US2016/047110, dated Nov. 17, 2016.
International Search Report and Written Opinion for PCT/US2019/014062, dated Apr. 25, 2019, 10 pages.
International Search Report and Written Opinion for PCT/US2022/039869, dated Nov. 30, 2022, 11 pages.
EP 19740953.5, European Search Report, dated Sep. 21, 2021, 12 pages.
International Search Report and Written Opinion issued in related Application Serial No. PCT/US2022/039869 on Nov. 30, 2022.

BREAKAWAY CONNECTOR

CROSS REFERENCES TO RELATED APPLICATION

This application is a non-provisional of U.S. Patent Application No. 63/231,020 filed Aug. 9, 2021 entitled BREAKAWAY CONNECTOR, which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH DEVELOPMENT

Not Applicable.

BACKGROUND

The present invention relates to devices and methods for fluid line connectors for medical and veterinary applications. More particularly, the present invention relates to breakaway connectors for attachment to needle-free fittings on intravenous fluid lines.

Conventional devices and methods for breakaway fluid line connectors generally include two housings joined together. A fluid pathway through the connector is broken when the two housings separate, and a valve in each housing is operable to stop the flow of fluid on each side when a separation event occurs. Conventional devices and methods utilizing such a configuration are used for a variety of applications, including intravenous (IV) medical lines including a soft, flexible tube placed inside a vein, usually in the hand or arm. When a sufficient amount of tension is applied to the line, the connector will separate, and the valves on each component of the connector will block fluid flow to prevent leakage.

In many medical applications, and particularly in peripheral intravenous lines, healthcare providers are increasingly implementing needle-free connectors to protect clinicians and patients. Needle-free connectors provide an access port to an intravenous line that does not require a needle insertion for transfer of fluids. Instead, needle-free connectors include a patient-side luer fitting with a seal that may be opened or pierced by a corresponding injection-side luer fitting or syringe. The seal receives the injection-side fitting in a sealed engagement, thereby establishing a fluid flow path between the injection-side component and the needle-free connector on the patient-side tubing apparatus. The seal may include a septum-style seal, an accordion seal, a push seal, or any other suitable seal known in the art for a needle-free engagement.

Needle-free connectors allow for quick connection and disconnection without the need for needles to transfer fluids. When the injection-side fitting is removed from the needle-free connector, the seal on the needle-free connector closes automatically, thereby preventing leakage of any fluid from the patient-side tubing assembly. As such, the needle-free connector on the patient-side includes an available seal which operates as a check valve to allow fluid flow into the patient-side tubing when opened, but preventing outflow when closed. These types of needle-free connectors have been rigorously designed to protect from contamination and can be easily cleaned to sterilize the external interfacing element and ensure microbes cannot ingress into the fluid path.

Conventional breakaway fluid line connectors with two valves (one on each component side of the breakaway mechanism) are generally not optimized for use with needle-free connectors because such configurations effectively include three valves when installed on a needle-free connector. The three valves include the injection-side valve on the connector, the outflow side valve on the connector and the seal on the needle-free connector. This type of configuration unnecessarily includes an intermediate valve and leads to a bulky and oversized assembly at an infusion site. As such, it is desirable to provide improvements to breakaway connector devices to make the engagement more efficient in size, scale and operation.

What is needed are improvements in devices and methods for breakaway connectors for use with fluid applications, and particularly for use with needle-free connectors in intravenous lines in medical and veterinary applications.

BRIEF SUMMARY

Figure 1:
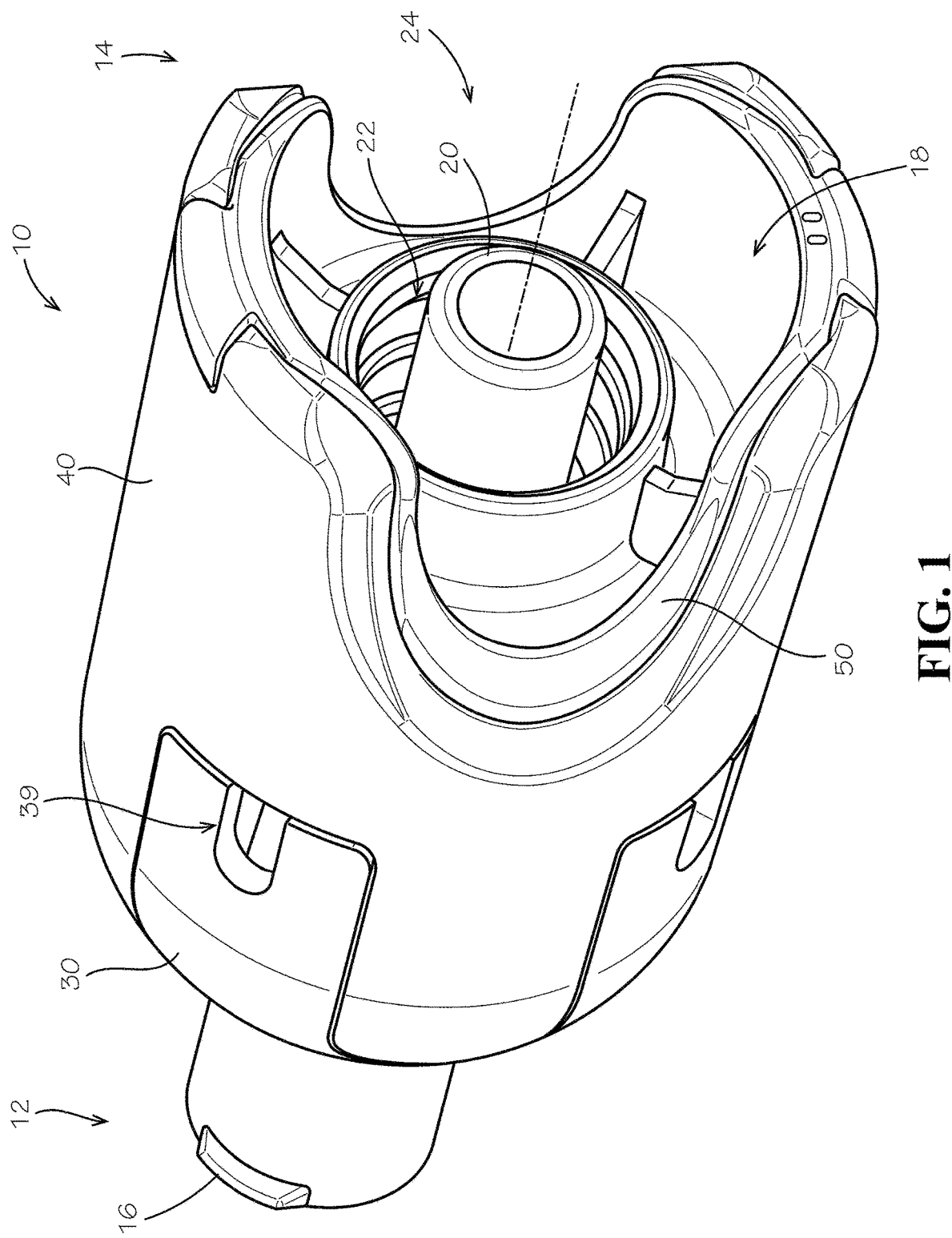
FIG. 1 illustrates a perspective view of an embodiment of a breakaway connector apparatus in accordance with the present disclosure.

The present disclosure relates to breakaway connector devices and methods for fluid lines. In some embodiments, the present disclosure provides a breakaway fluid line connector with only one valve that may be connected to an existing needle-free connector or needle-free fitting on an IV line attached to a patient. The needle-free connector engages with a corresponding fitting on the breakaway connector device, such as a luer fitting.

When a threshold tensile force is applied to the breakaway connector, the needle-free connector and a breakaway component on the device separate together as one unit from the housing and shell of the device. Upon such an event, a valve in the device blocks incoming fluid flow, and the seal on the needle-free connector blocks outflow from the patient-side tubing assembly. As such, the breakaway connector is able to take advantage of the already-placed needle-free connector disposed on the patient's tubing set in the medical field to function as a patient-side valve.

By taking advantage of a part that is already present on the patient's side of the intravenous line, the breakaway connector design and manufacture can be greatly simplified to include fewer parts, reduce the cost of manufacture, reduce size, improve sterility and reduce potential for user error or malfunction during installation and use.

In further embodiments, the present disclosure provides a breakaway connector device including a moveable cannula configured to translate axially inside the device to selectively open a valve housed within the device. The moveable cannula activates the valve on one end, and pierces the seal on the needle-free connector on the opposite end. When the breakaway device is coupled to the needle-free connector, a fluid path is opened from the connector, through the cannula and into the needle-free connector.

In some embodiments, the cannula is biased away from the valve based on the mechanical compressibility of the valve itself, or an external biasing member such as a spring. Upon a separation event, the cannula will travel away from the valve in the device and also disengage from the seal on the needle-free connector, causing the valve to close and the seal on the needle-free connector to also close.

In further embodiments, the present disclosure provides a breakaway connector including a compressible sheath covering a channel in the device, wherein the sheath may be pushed back by the needle-free connector to allow flow. When a separation event occurs, the sheath springs back into its closed position covering the channel.

Numerous other features and advantages of the present disclosure are set forth in the following description and accompanying figures.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Referring to FIG. 1, the present disclosure provides a breakaway connector device 10 for attachment to a fluid line. Device 10 includes an input side 12 and an output side 14. Input side 12 may be referred to as a pump side when the device is coupled to an infusion pump. Output side 14 may be referred to as a patient side when the device is coupled to a patient's intravenous line. An input fitting 16 includes a male or female luer fitting in some embodiments.

A socket 18 disposed in the device 10 at the output side 14 provides a cavity or recess shaped to accommodate insertion of a needle-free connector. A cannula 20 protrudes from the device 10 toward the socket 18 and is positioned to engage a seal on the needle-free connector. A fitting 22 disposed on the output side 14 in the socket 18 includes a female luer fitting in some embodiments. Fitting 22 is configured to engage a corresponding fitting on the needle-free connector to secure the needle-free connector to the device 10. A window 24 is defined in device 10 adjacent socket 18. Window 24 provides access to socket 18 for manipulating the needle-free connector when received in the socket 18.

Figure 2:
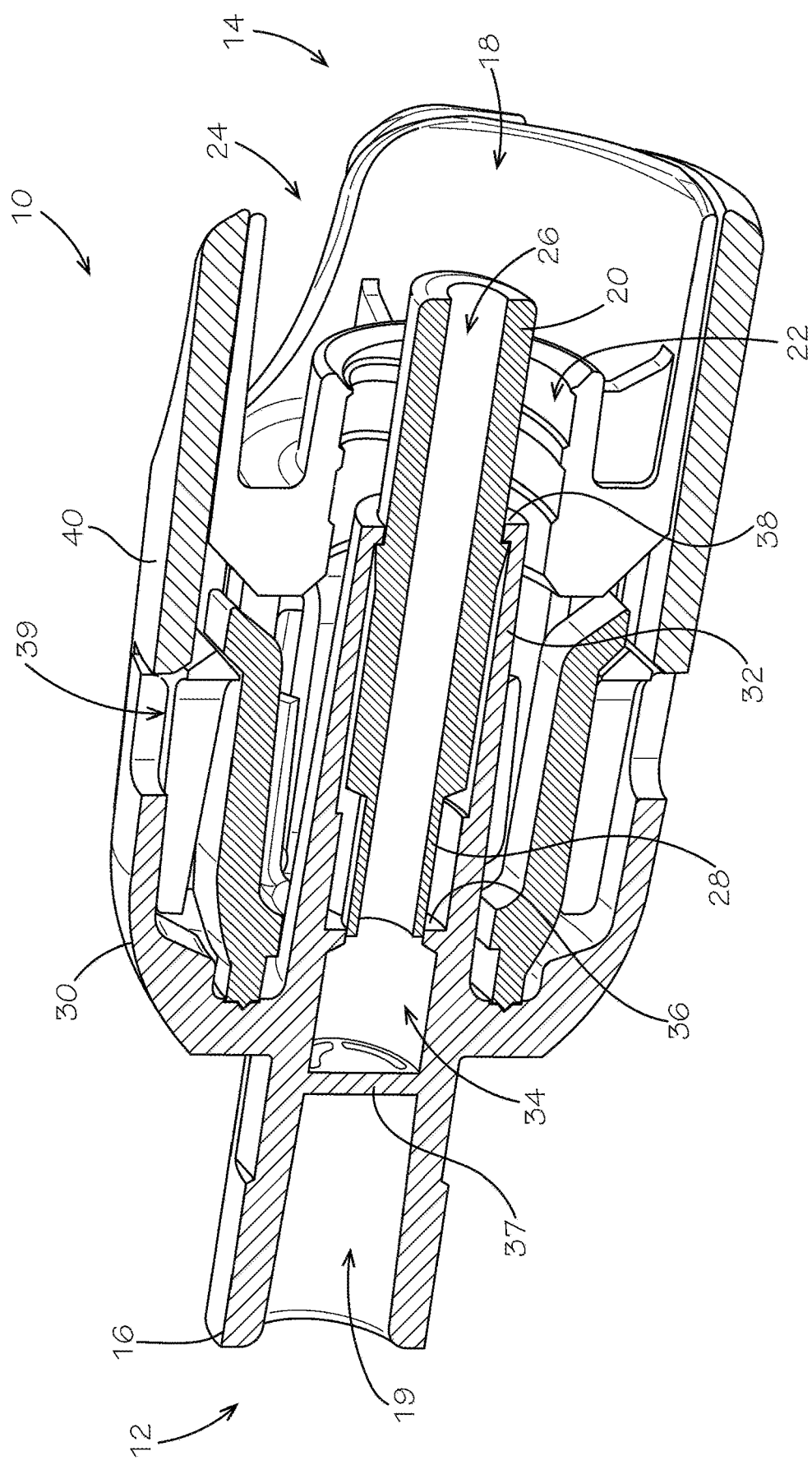
FIG. 2 illustrates a perspective cross-sectional view of the embodiment of a breakaway connector apparatus of FIG. 1 with the axially-moveable cannula in a disengaged position.
Figure 3:
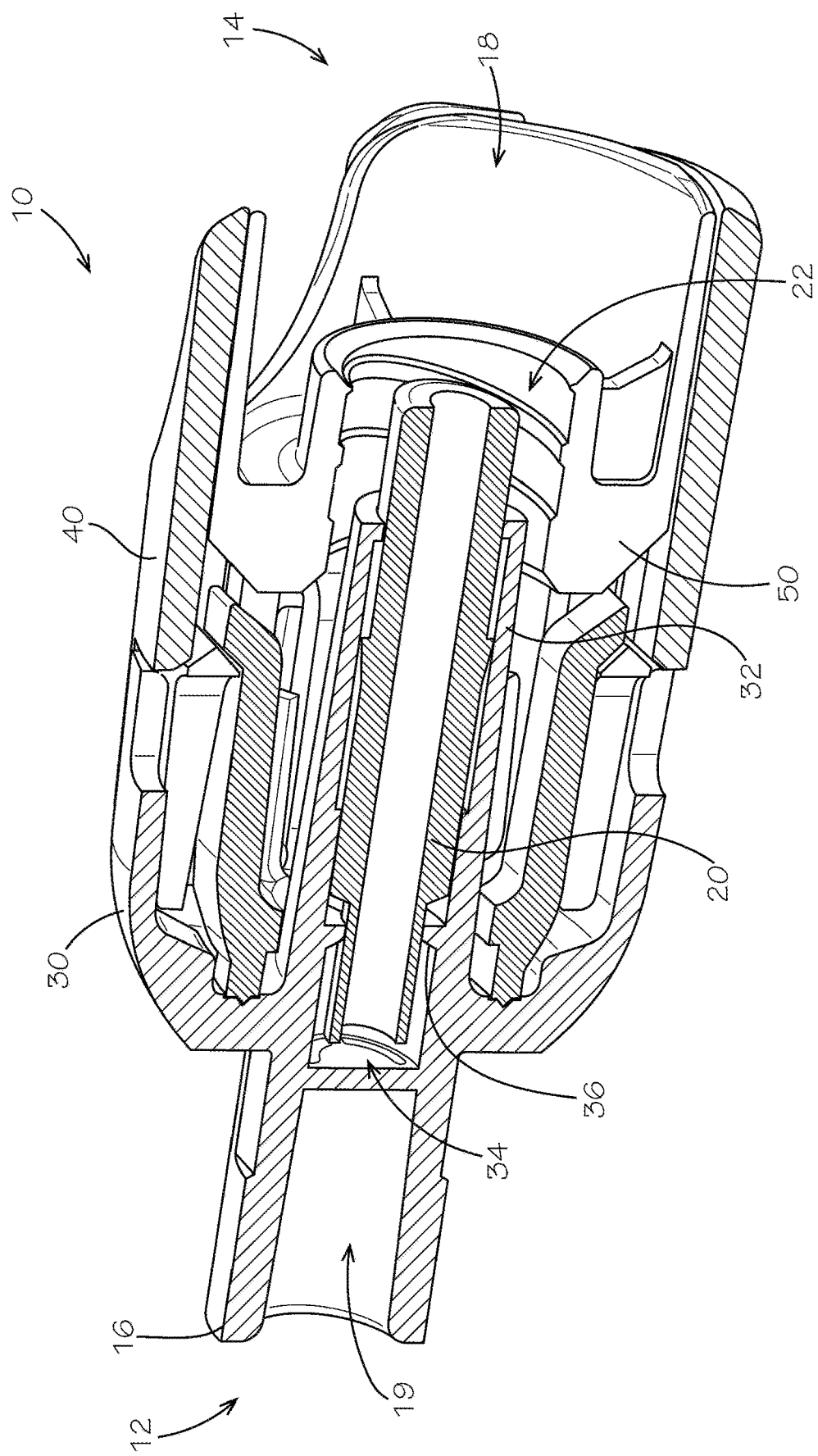
FIG. 3 illustrates a perspective cross-sectional view of the embodiment of a breakaway connector apparatus of FIG. 1 with the axially-moveable cannula in an engaged position.

Referring to FIG. 2 and FIG. 3, a partial cross-sectional view of an embodiment of a breakaway connector device 10 is shown. As shown in FIG. 2, cannula 20 includes an open bore 26 defined axially through the cannula from end to end. Bore 26 allows the flow of fluid through cannula 20. Cannula 20 has an input end oriented toward input side 12, and an output end oriented toward output side 14. The input side of cannula 20 includes a stem 28 having a tapered or reduced radial profile in some embodiments.

Cannula 20 is housed in a central channel 32 on housing 30. Channel 32 includes a cylindrical sleeve, and cannula 20 is partially positioned inside the sleeve. Cannula 20 is axially moveable inside device 10 by translating back and forth inside channel 32 on housing 30. A valve chamber 34 is defined in channel 32 at the input end of cannula 20. An input seal 36 is defined between stem 28 and channel 32 such that stem 28 may slide axially relative to channel 32 without leaking fluid in some embodiments. A valve is disposed in valve chamber 34. The valve is a check valve in some embodiments. The valve can include many forms such as but not limited to an ear plug valve, orchid type valve, duckbill valve, or any other suitable valve known in the art.

During use, cannula 20 may be depressed axially away from the needle-free connector when joined, causing stem 28 to translate toward and engage the valve contained in valve chamber 34. The engagement between stem 28 on cannula 20 and the valve causes the valve to become opened, thereby allowing fluid to travel through inlet 19, into cannula 20 and into the needle-free connector.

An example of axial translation of cannula 20 is shown in the relative positioning of cannula 20 in FIG. 2 and FIG. 3. In some embodiments, a valve chamber wall 37 is disposed in channel 32 at the input side of valve chamber 34. Wall 37 provides a mechanical stop for the valve to prevent the valve from sliding away from cannula 20 when activated. Wall 37 includes openings or perforations to allow fluid flow from inlet 19 into the bore 26 of cannula 20 in some embodiments. When a breakaway event occurs, the cannula is biased toward the output side and slides back away from the valve chamber to a position as shown in FIG. 2.

Figure 4:
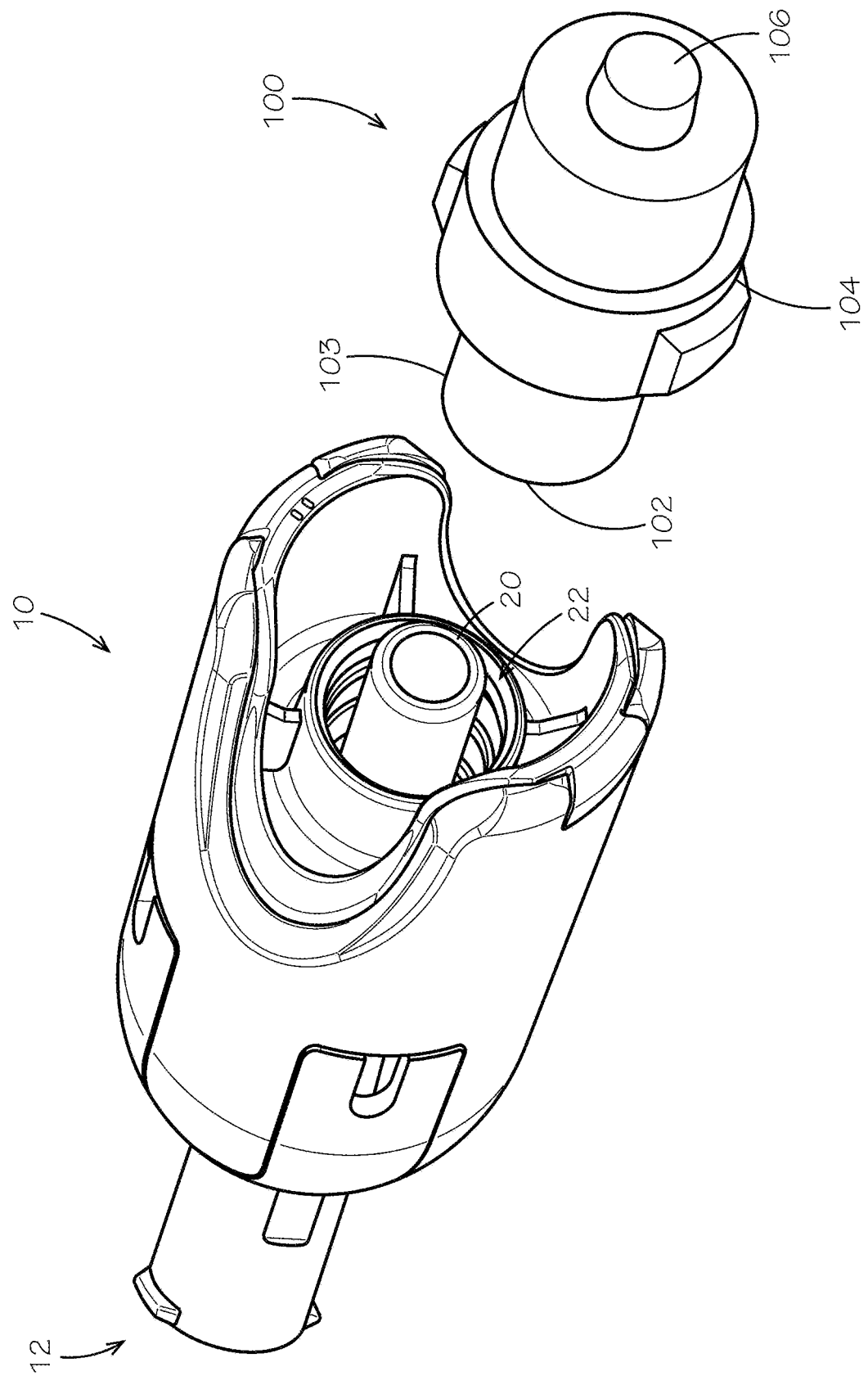
FIG. 4 illustrates a perspective exploded view of an embodiment of a breakaway connector apparatus in accordance with the present disclosure positioned for attachment to a needle-free connector.

Referring to FIG. 4, an example of a breakaway connector device 10 is shown positioned for attachment to a needle-free connector 100. Needle-free connector may include any conventional needle-free device, such as a BD Q-Syte, BD MaxPlus, BD MaxZero or any other suitable needle-free connector known in the art. Needle-free connector 100 includes an interface 102 including a seal. Interface 102 may include any known seal such as a split septum. Needle-free connector 100 also includes a fitting 103 such as a male or female luer fitting configured to engage corresponding fitting 22 on device 10. Needle-free connector 100 also includes a body 104 and a tubing junction 106 extending away from the connector 100 toward a patient.

Figure 5:
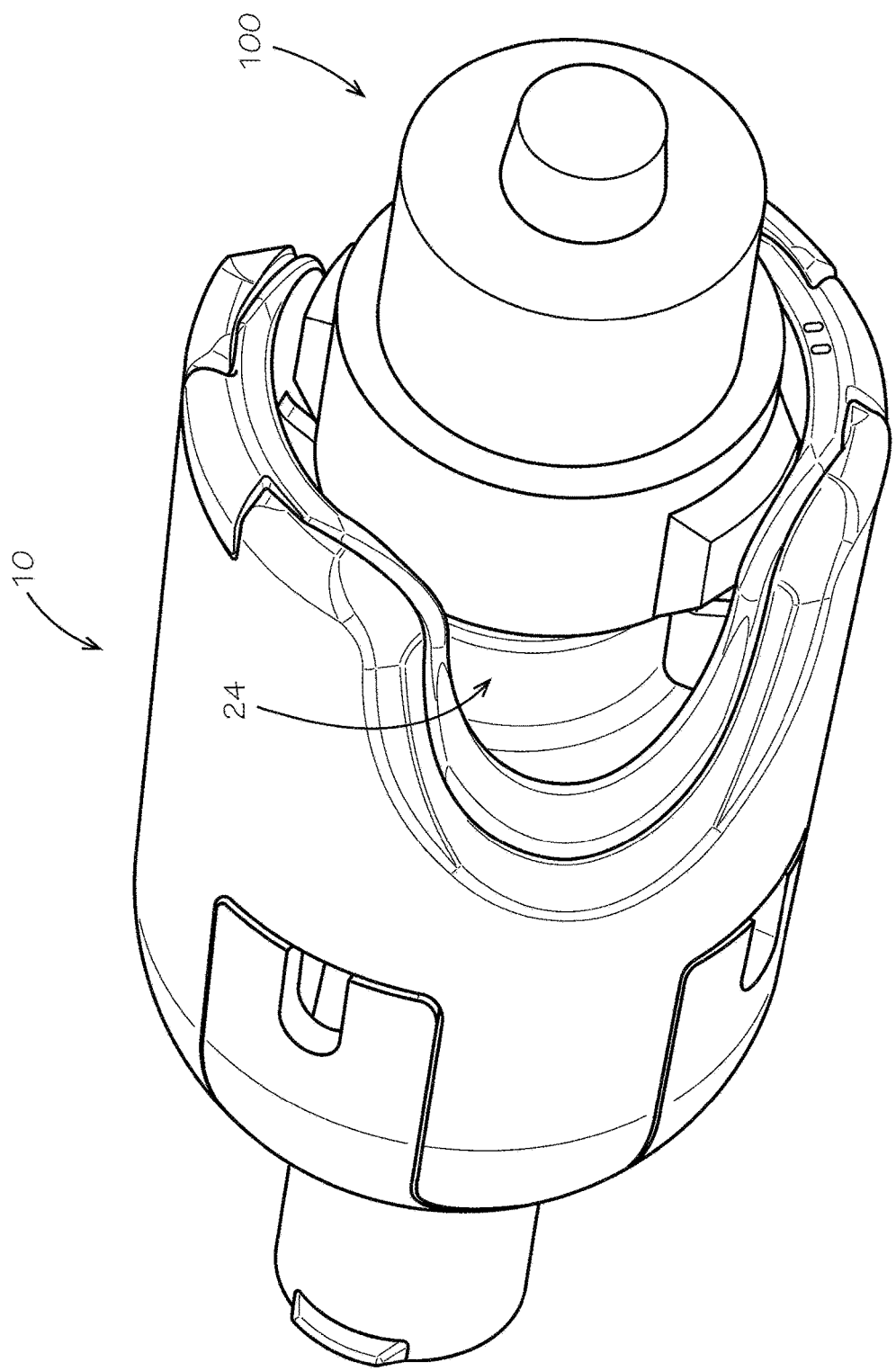
FIG. 5 illustrates a perspective view of an embodiment of a breakaway connector apparatus in accordance with the present disclosure attached to a needle-free connector.

As shown in FIG. 5, needle-free connector 100 is joined directly to breakaway device 10. The engagement can be viewed through window 24. Window 24 also permits a user to manually twist or turn needle-free connector 100 if necessary to engage the threaded luer fitting between the components.

Figure 6:
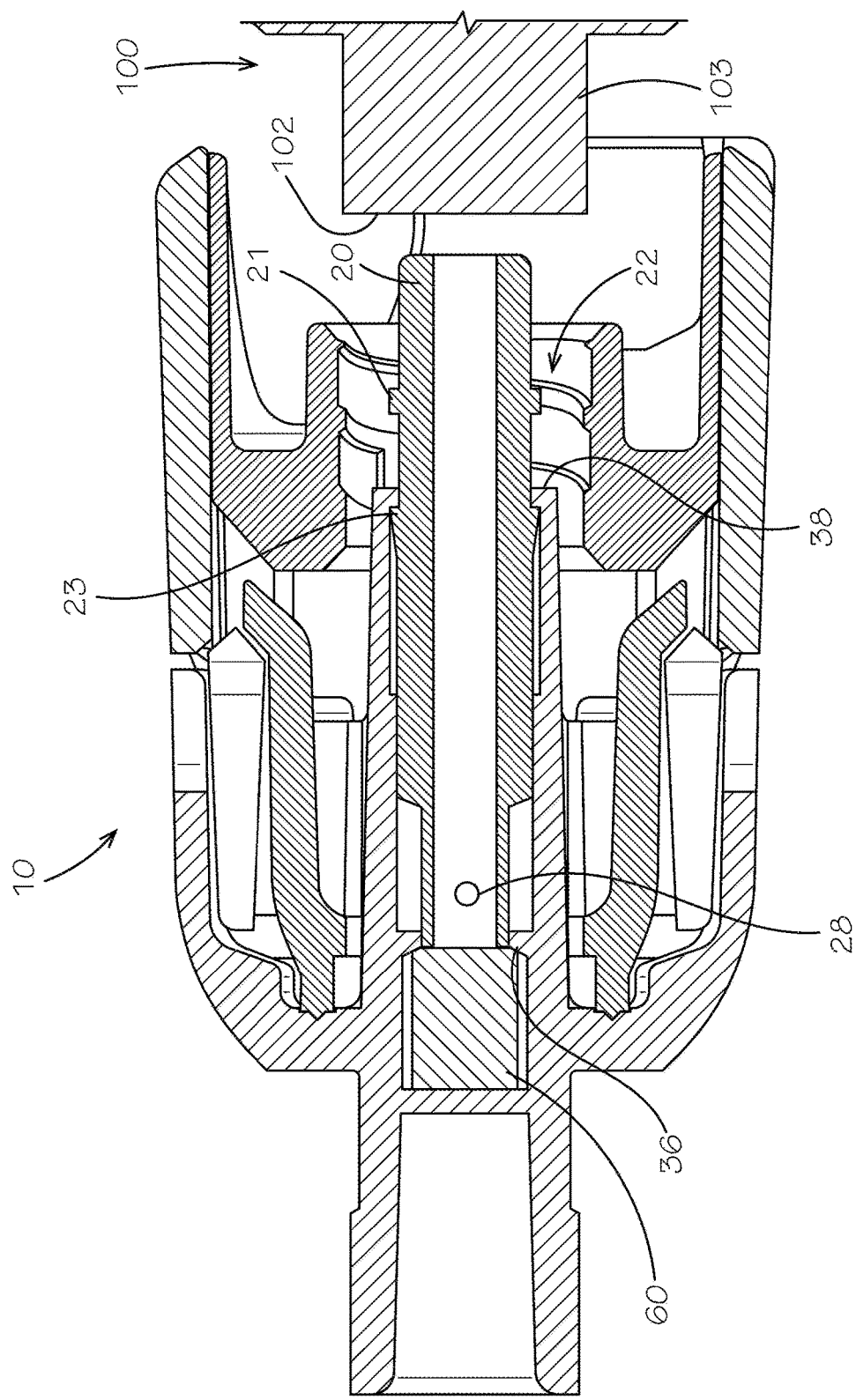
FIG. 6 illustrates a cross-sectional view of an embodiment of a breakaway connector apparatus positioned for attachment to a needle-free connector.
Figure 7:
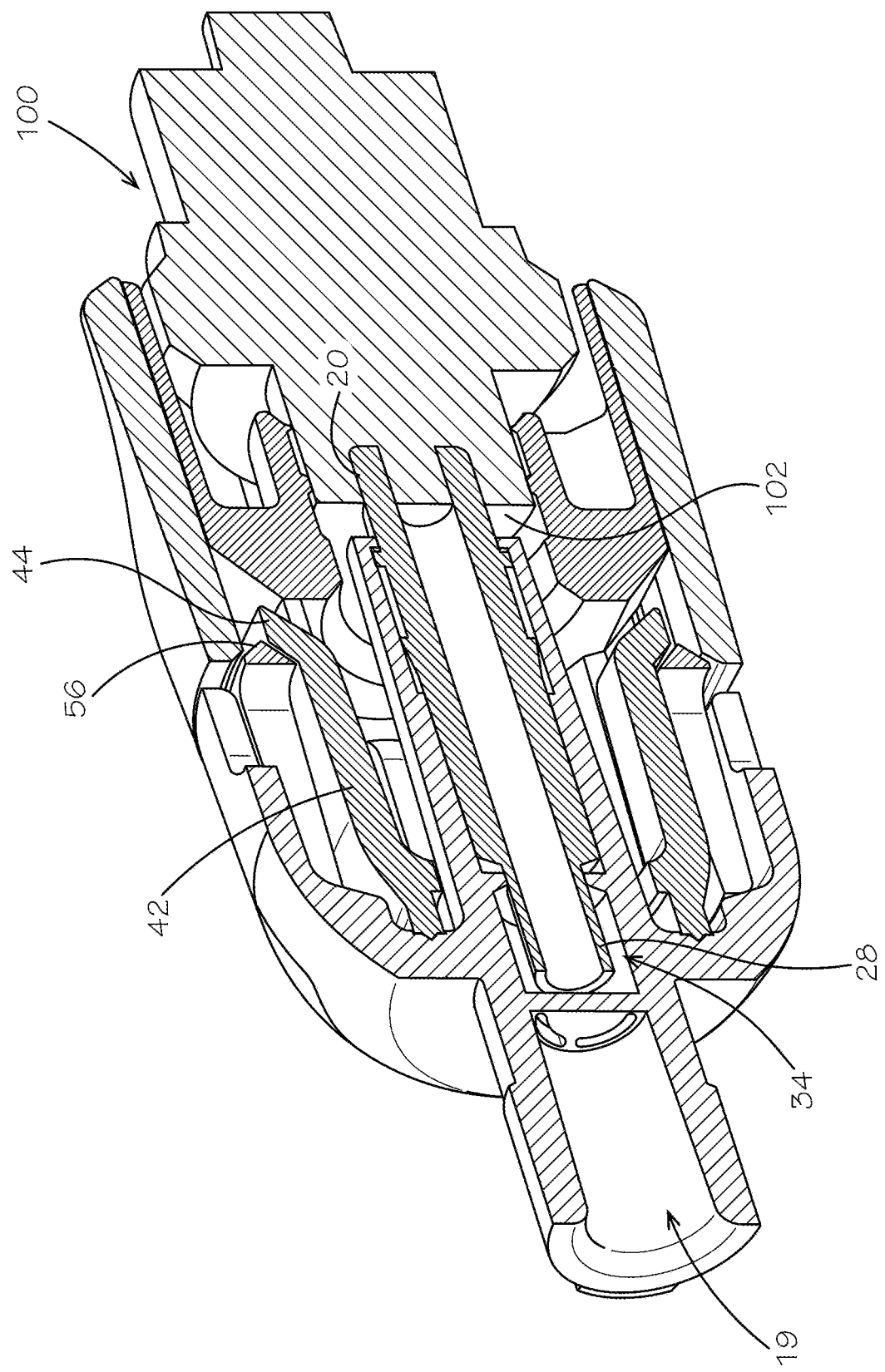
FIG. 7 illustrates a cross-sectional perspective view of an embodiment of a breakaway connector apparatus attached to a needle-free connector.

Referring to FIG. 6 and FIG. 7, prior to attachment of the device 10 to a needle-free connector 100, interface 102 is positioned directly opposite the output end of cannula 20. From this position, fitting 103 engages with corresponding features on fitting 22, thereby causing cannula 20 to penetrate interface 102, and simultaneously causing stem 28 to advance into valve chamber 24 thereby activating and opening the valve. The dual action of sliding cannula 20 provides simultaneous or near-simultaneous opening of the seal on the needle-free connector and opening of the valve positioned in valve chamber 34.

Referring further to FIG. 6, in some embodiments, the cannula 20 includes a flange 21 protruding radially from the outer surface of cannula 20 outside of channel 32. Flange 21 provides an axial stop for interface 102 or for other structural features on needle-free connector 100. When a structure on needle-free connector 100 engages flange 21, relative travel between cannula 20 and needle-free connector stops, and cannula is pushed by needle-free connector toward the valve chamber 34. As stem 28 passes by seal 36, stem 28 engages and opens valve 60.

Also shown in FIG. 6, cannula 20 includes a barb 23 protruding from a portion of cannula 20 housed within channel 32. Barb 23 provides an axial stop for travel of cannula 22 in the direction away from valve 60. When needle-free connector 100 is not engaged with device 10, cannula 20 is biased away from valve 60, and barb 23 engages channel stop 38 to prevent cannula from sliding too far out the end of channel 32.

Figure 8:
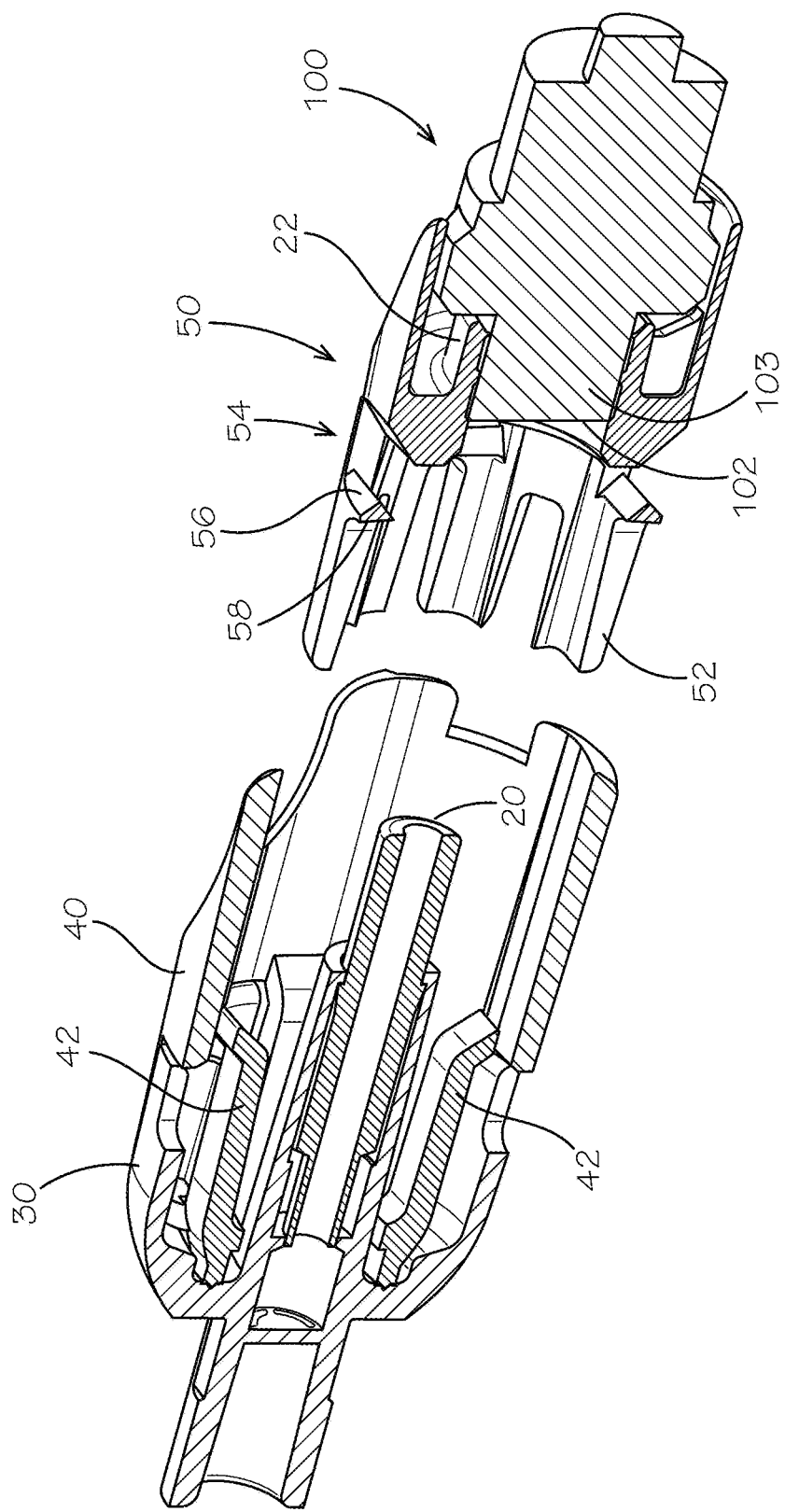
FIG. 8 illustrates a cross-sectional perspective view of an embodiment of a breakaway connector apparatus with a breakaway component and needle-free connector detached from the apparatus.

Referring to FIG. 8, when tension is applied to the line, needle-free connector 100 and breakaway component 50 may separate together as one unit from shell 40 and housing 30. Upon such an event, cannula 20 will automatically extend away from the valve in valve chamber 34 by force of the valve pushing the cannula or by a coil spring or other biasing member in channel 32. Following separation, breakaway component 50 separates fully from shell 40.

A plurality of protrusions 52 extend from breakaway component 50 in a direction away from needle-free component 100. Protrusions 52 provide a shield that prevents contamination of interface 102 on needle-free connector 100 by mechanically blocking access to the needle-free connector. Following separation, breakaway component 50 may be carefully removed from the needle-free connector 100 by unscrewing the threaded luer connection between the items.

The tensile force associated with a separation event may be finely tuned by controlling the geometries of the components and the mechanical engagements between breakaway component 50 and shell 40. For example, in some embodiments, shell 40 includes one or more securing arms 42 extending toward breakaway component 50. Each arm 42 includes a flexible tip 44 angled radially away from channel 32. Each arm 42 and tip 44 may have an independent stiffness defined by material composition, thickness, shape and angle of orientation, among other parameters. Each arm 42 may deflect toward channel 32 as tip 44 slides past a corresponding ramp 56 on breakaway component 50 during a separation event. The inclined angle of ramp 56 also contributes to the tensile force required to disengage breakaway component 50 from device 10.

A square wall 58 oriented substantially perpendicular to the longitudinal direction of the device blocks tip 44 in the event the device is attempted to be re-assembled from the configuration shown in FIG. 8. This feature provides an anti-reconnection function that prevents breakaway component 50 from being re-inserted into shell 40. This feature maintains sterility and forces a user to install a new sterile device following separation.

Slot 54 is aligned with opening 39 in housing 30, forming a keyhole, to provide access to arm 42. The keyhole access allows a tool to be inserted to depress arm 42, allowing tip 44 to clear wall 58 when breakaway component 50 is initially installed in shell 40 during manufacture. However, the design prevents a user from being able to deflect arm 42 to attempt to re-connect a used device.

Figure 9:
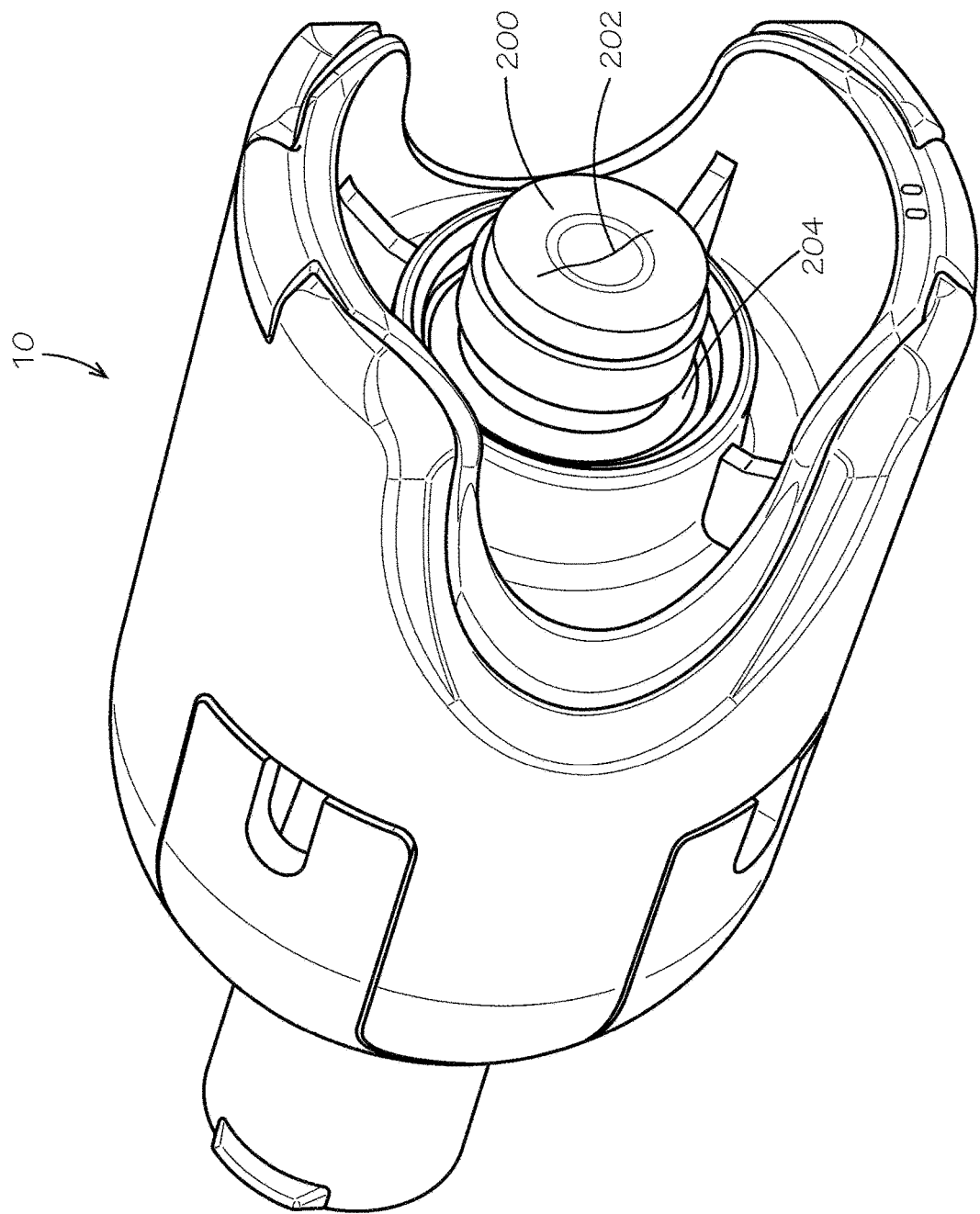
FIG. 9 illustrates a perspective view of an alternative embodiment of a breakaway connector apparatus in accordance with the present disclosure.
Figure 10A:
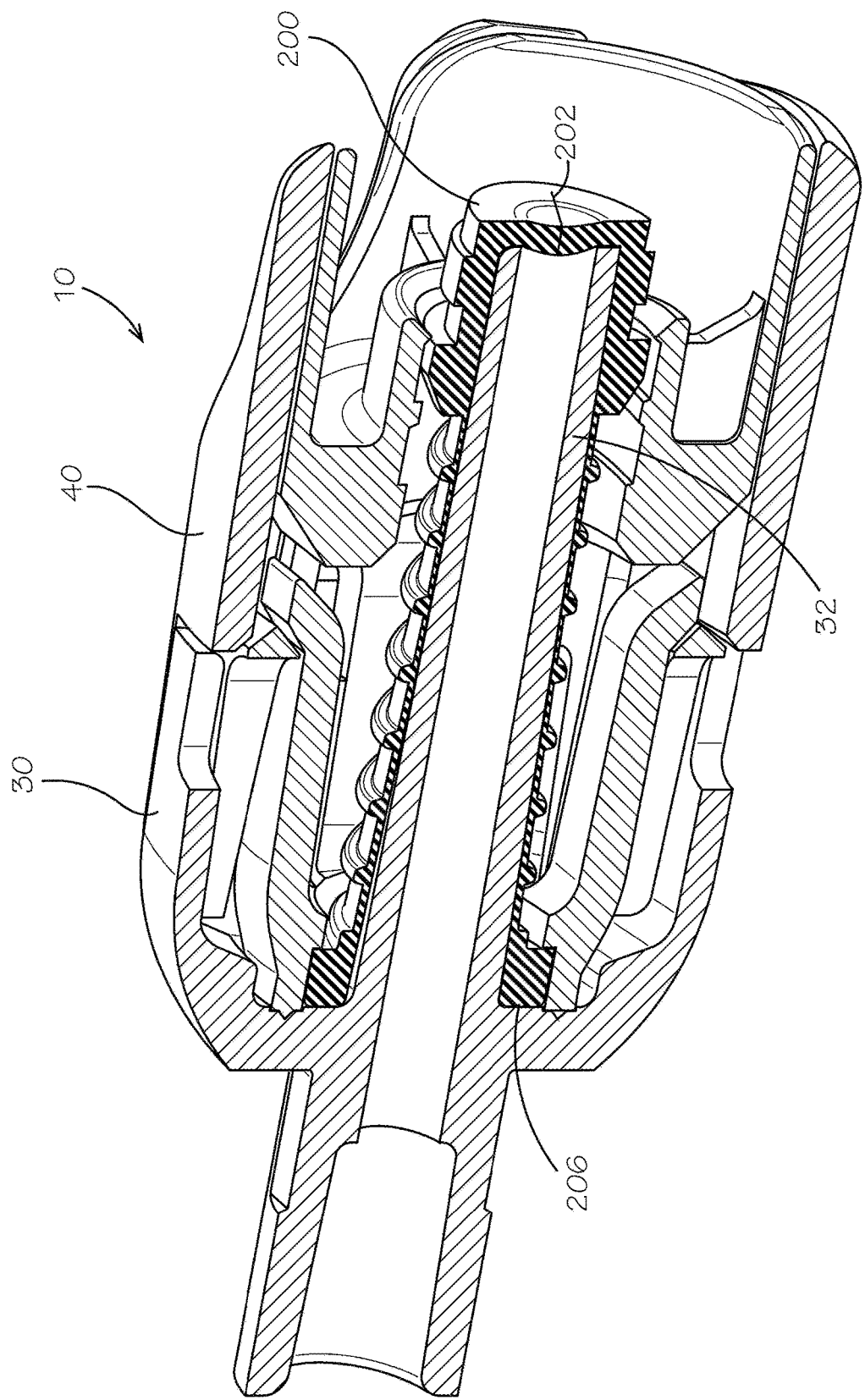
FIG. 10A illustrates a cross-sectional perspective view of the embodiment of a breakaway connector apparatus of FIG. 9.

Referring to FIG. 9 and FIG. 10A, an alternative embodiment of device 10 includes a channel 32 with a compressible sheath 200 positioned over the channel 32. Sheath 200 includes an accordion-style compressible sheath formed from a flexible material, such as a plastic, silicone, polymer or elastomer. Sheath 200 includes a seal 202, which may include a split-septum style seal in some embodiments. Seal 202 is biased in a closed position. When a needle-free connector is installed on device 10, the interface 102 engages seal 202 and pushes sheath 200 back over channel 32, thereby opening seal 202 and allowing fluid to travel through channel 32 and into the needle-free connector.

When a separation event occurs, the sheath 200 will spring back to its original shape covering channel 32 and causing seal 202 to close, thereby stopping flow out of the connector. Sheath 200 includes a sheath flange 206 extending radially from the base of the sheath. Sheath flange 206 is clamped between shell 40 and housing 30 in some embodiments to secure the axial position of sheath 200 on channel 32.

Figure 10B:
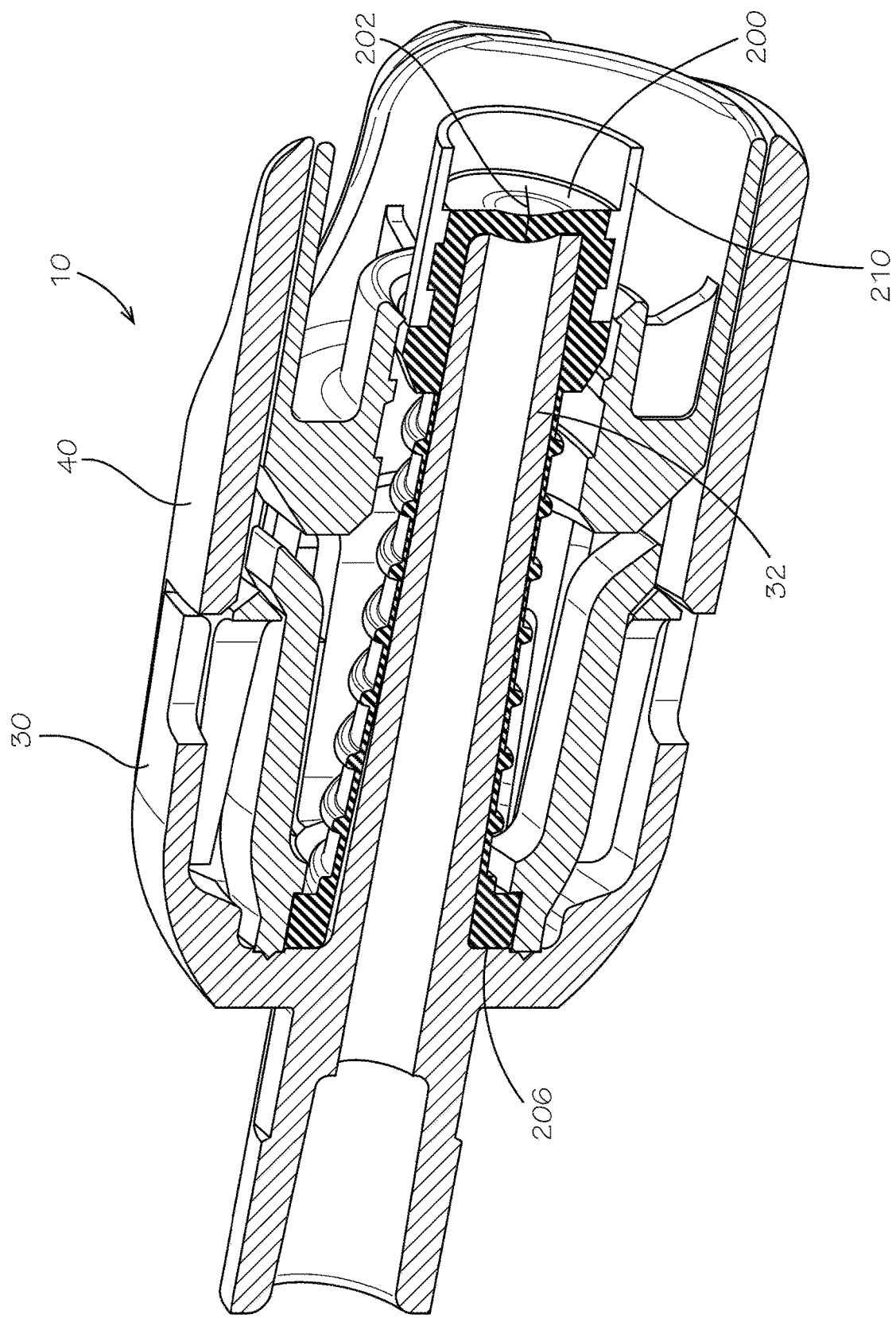
FIG. 10B illustrates a cross-sectional perspective of an alternative embodiment of a breakaway connector apparatus in accordance with the present disclosure.

Referring further to FIG. 10B, in some embodiments, a bulkhead 210 is disposed on the distal end of the compressible sheath 200. Bulkhead 210 includes an axisymmetric body having an outer wall in the shape of a smooth cylinder in some embodiments. In other embodiments, bulkhead 210 may include other shapes and textures. Bulkhead 210 is formed of a rigid or semi-rigid material, and bulkhead engages with the needle-free connector when installed on device 10. Bulkhead 210 functions to translate axial force from the needle-free connector onto the compressible sheath 200 to push sheath 200 backwards over channel 32, thereby opening fluid flow through device 10. In such embodiments, the distal end of sheath 200 does not contact the interface 102 of the needle-free connector directly, but instead the tip of channel 32 penetrates interface 102 when the needle-free connector is installed on device 10. Bulkhead 210 is not necessary in all embodiments, and may be omitted in embodiments where the sheath 200 is dimensioned and shaped to provide adequate strength and resiliency to engage directly with the needle-free connector as shown in FIG. 10A. In further embodiments, bulkhead 210 is integrally formed on sheath 200 as a one-piece construction. Additionally, in some embodiments, bulkhead 210 is overmolded onto sheath 200 as a separate component. In other embodiments, bulkhead 210 is a separate component press-fit onto the tip of sheath 200. Multiple corresponding radial flanges are provided at the interface between bulkhead 210 and sheath 200 in some embodiments. Each flange provides an axial stop to prevent bulkhead 210 from sliding relative to the outer surface of sheath 200 when pushed by the needle-free connector.

Figure 11:
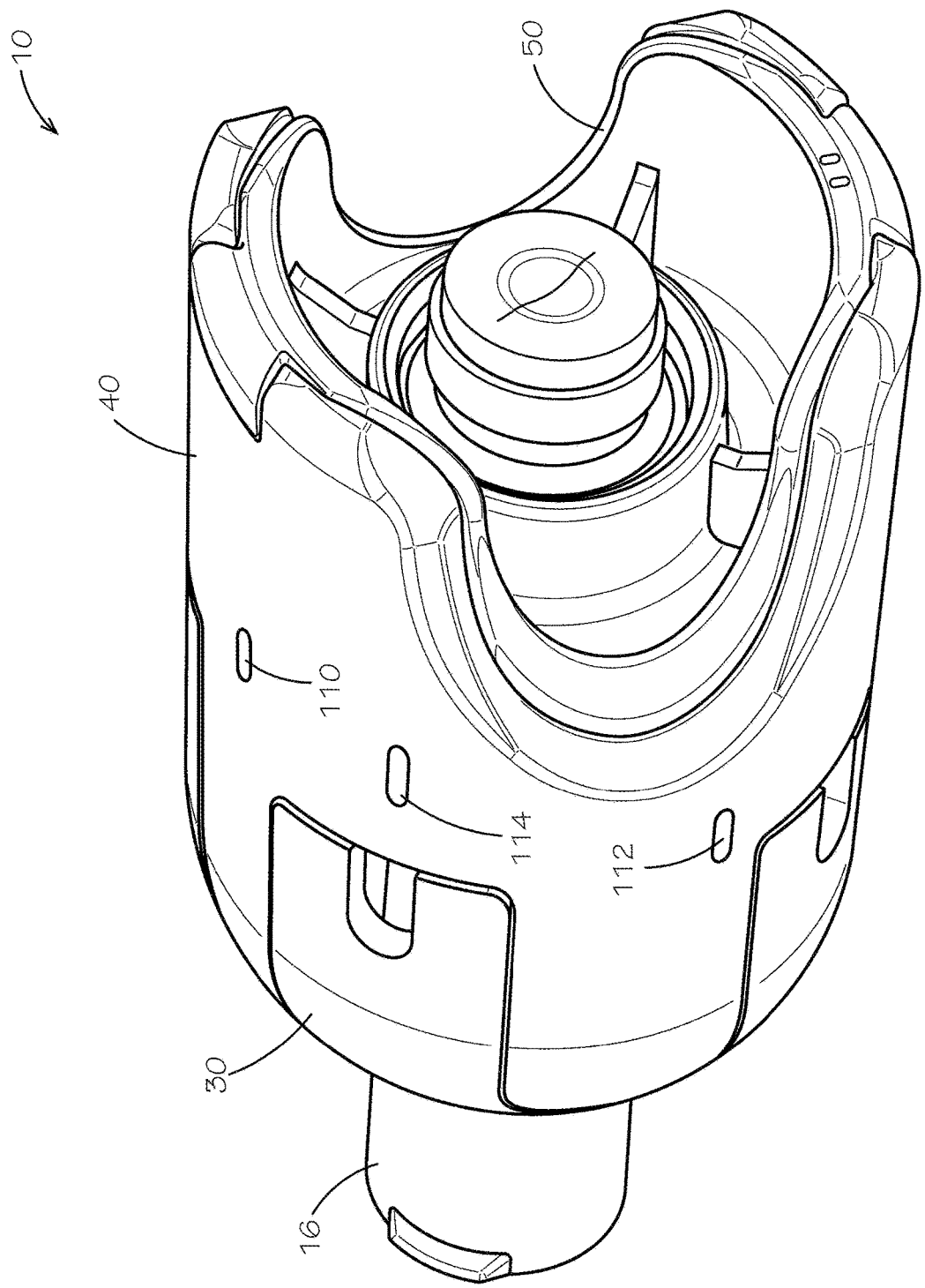
FIG. 11 illustrates a perspective view of an alternative embodiment of a breakaway connector apparatus in accordance with the present disclosure.

Referring to FIGS. 11, in some embodiments, the present disclosure provides a connector 10 including a housing 30, a shell 40 and a breakaway component 50. The connector is configured to provide one or more indicia to a user representative of a state condition of the connector. For example, in some embodiments, connector 10 includes one or more visual indicia such as a light indicating a status of the connector 10. Visual indicia 110 includes a LED light visible to a user in some embodiments. The LED light may be positioned on the housing 30, shell 40 or breakaway component 50. In some embodiments, the LED light is positioned on the surface of the connector 10 to provide a visual indication of the status of the device. The LED may be configured to display a first color when the device is in a first condition, and a second color when the device is in a second condition. Additionally, the LED may provide a blinking pattern to provide a status indicator of the connector 10. The LED light may flash in a first color and pattern. The frequency of the light strobe may increase over time immediately after separation. In some embodiments, the light strobes at one flash every 3 seconds, after 5 minutes it increases to one flash every 2 seconds, after 15 minutes it flashes once every second, etc. After 30 minutes, the LED may switch to a pattern of on for 1 second, two flashes/pulses, then back on for one second, and repeat. Various other combinations and patterns may be provided to indicate different state conditions to a user.

Figure 12:
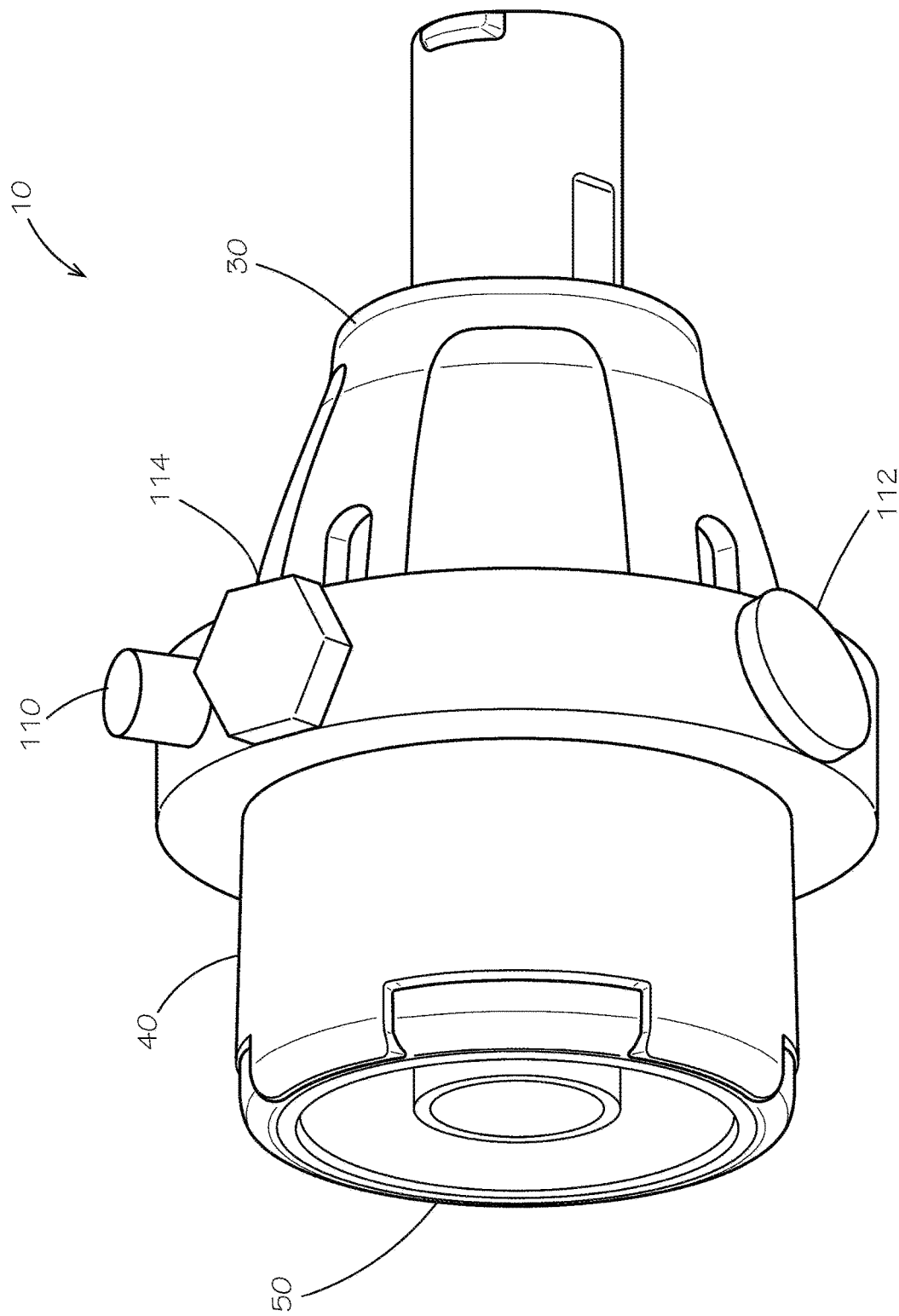
FIG. 12 illustrates a perspective view of an alternative embodiment of a breakaway connector apparatus in accordance with the present disclosure.

As shown in FIG. 11, in some embodiments, the visual indicator 110 is mounted inside the connector 10 such that the indicator 110 is flush with the surface of the connector. In other embodiments, the connector material is translucent, and the visual indicator 110 is embedded within the connector 10 such that the light emitted from the LED is visible through the connector material. Alternatively, the LED indicator may be positioned on an external structure attached to the exterior of the connector 10, as shown in FIG. 12. The visual indicator 110 in the form of an LED is positioned on the exterior of the ring, and the ring may be installed onto the connector 10 as a separate component.

Referring further to FIG. 11 and FIG. 12, in some embodiments, the present disclosure provides a connector 10 including a housing 30, a shell 40 and a breakaway component 50. The connector is configured to provide one or more audio indicators 112 configured to provide an auditory signal to a user indicative of a status condition of the connector 10. Audio indicator 112 includes a speaker or electronic sound-generating component in some embodiments. Audio indicator 112 is positioned on or near the surface of component 10, as shown in FIG. 11, in some embodiments. Audio indicator 112 is configured to emit one or more sounds to indicate a state of the connector 10. In some embodiments, following a separate event, the audio alarm provides a first pattern of beeping followed by increasing the rate of the beeping over time. After a predetermined period of time, the audio indicator may switch to different pattern instead of an overly repetitive/metronome like interval (for example beep . . . beep beep . . . beep . . . beep beep beep . . . ).

In some embodiments, connector 10 includes both a visual indicator 110 and an audio indicator 112. In other embodiments, connector 10 includes a visual indicator 110 and no audio indicator 112. In further embodiments, connector 10 includes an audio indicator 112 and no visual indicator 110. Various other combinations of one or more visual indicators 110 and audio indicators 112 are provided within the scope of this disclosure.

Referring further to FIG. 11 and FIG. 12, the on-board electronics for the visual indicator 110 and the audio indicator 112 are powered by a battery 114. Battery 114 may be positioned on or near the surface of connector 10 as shown in FIG. 11. Alternatively, battery 114 may be positioned on an external structure such a ring disposed on connector 10, as shown in FIG. 12. In some embodiments, battery 114 is positioned in a rotational switch, such as the hexagonal component shown in FIG. 12, allowing a user to selectively engage or disengage the battery from the electronics circuit. For example, following a separation event, the hexagonal rotational switch may be rotated to disconnect the battery 114, thereby disabling the visual and/or audio indicators when the disconnected device is discarded.

Figure 13:
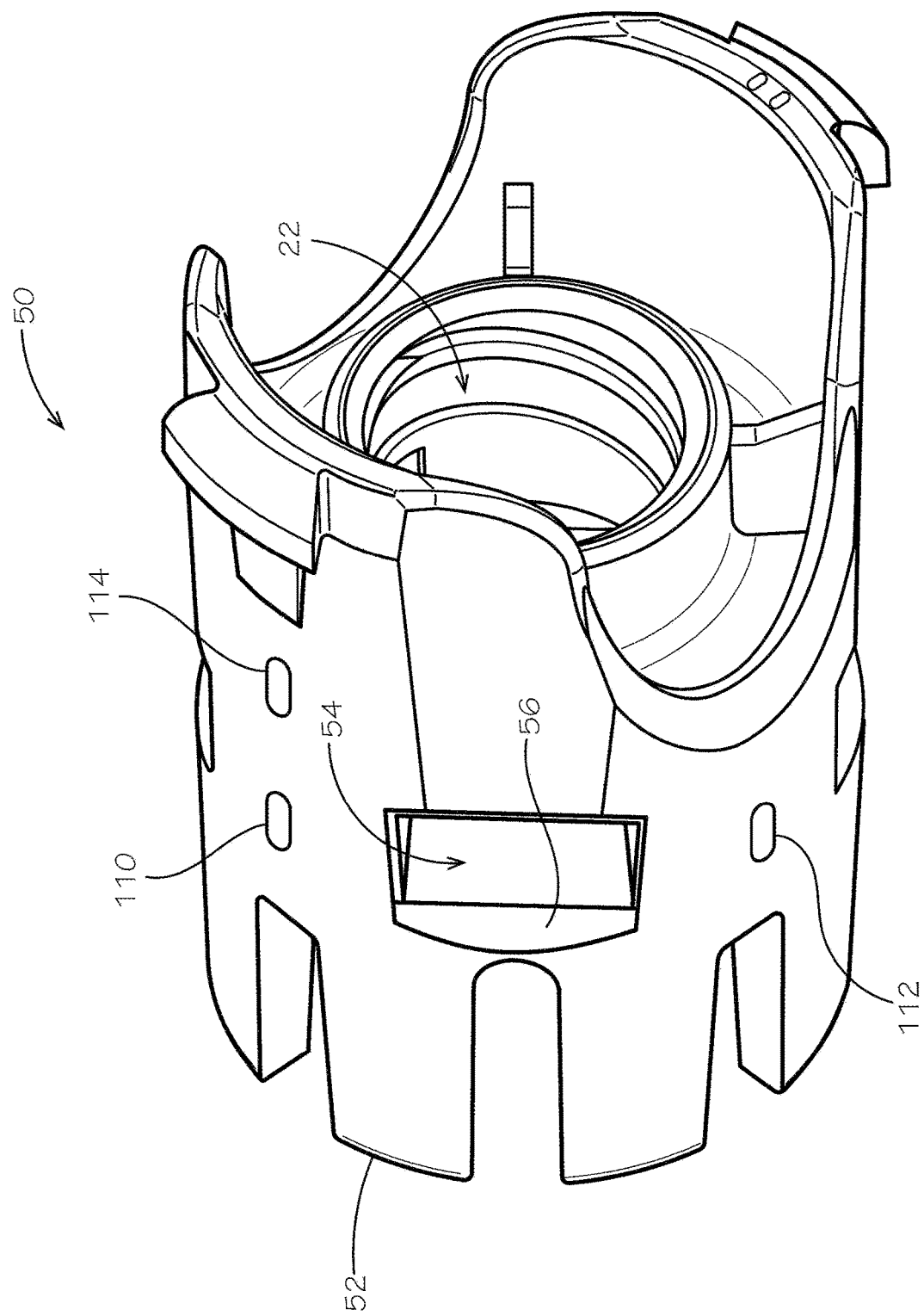
FIG. 13 illustrates a perspective view of an embodiment of a breakaway component including a battery, visual indicator and audio indicator.

Referring to FIG. 13, in some embodiments, breakaway component 50 includes a luer socket 22 configured for attachment to a needle-free connector on a patient's tubing set. Breakaway component 50 also includes a ramp window 54 and a ramp 56 configured to engage corresponding securing arms on the device. Breakaway component 50 also includes one or more protrusions 52 extending in a direction away from luer socket 22 to protect the passageway leading to the luer socket and the seal on the needle-free connector when attached. Breakaway component 50, in some embodiments, includes a visual indicator 110, such as an LED or other electronic component. Visual indicator 110 is mounted on the body of the breakaway component 110 flush with the exterior surface in some embodiments. Alternatively, visual indicator 110 is located internal to the breakaway component 50, and light from the LED shines through the material of the body. In other embodiments, visual indicator 110 is located on the external surface of the body of the breakaway component 50. Additionally, in some embodiments, breakaway component 50 includes an audio indicator 112 configured to emit sound from the device when the breakaway component is separated from the breakaway connector. The audio indicator 112 may be mounted flush with the surface, internal to the component or external to the component. A battery 114 is also installed on breakaway component 50 in some embodiments. Battery 114 provides power to the visual indicator 110 and the audio indicator 112. Battery 114 may be mounted flush with the surface, internal to the component or external to the component in various embodiments.

Figure 14:
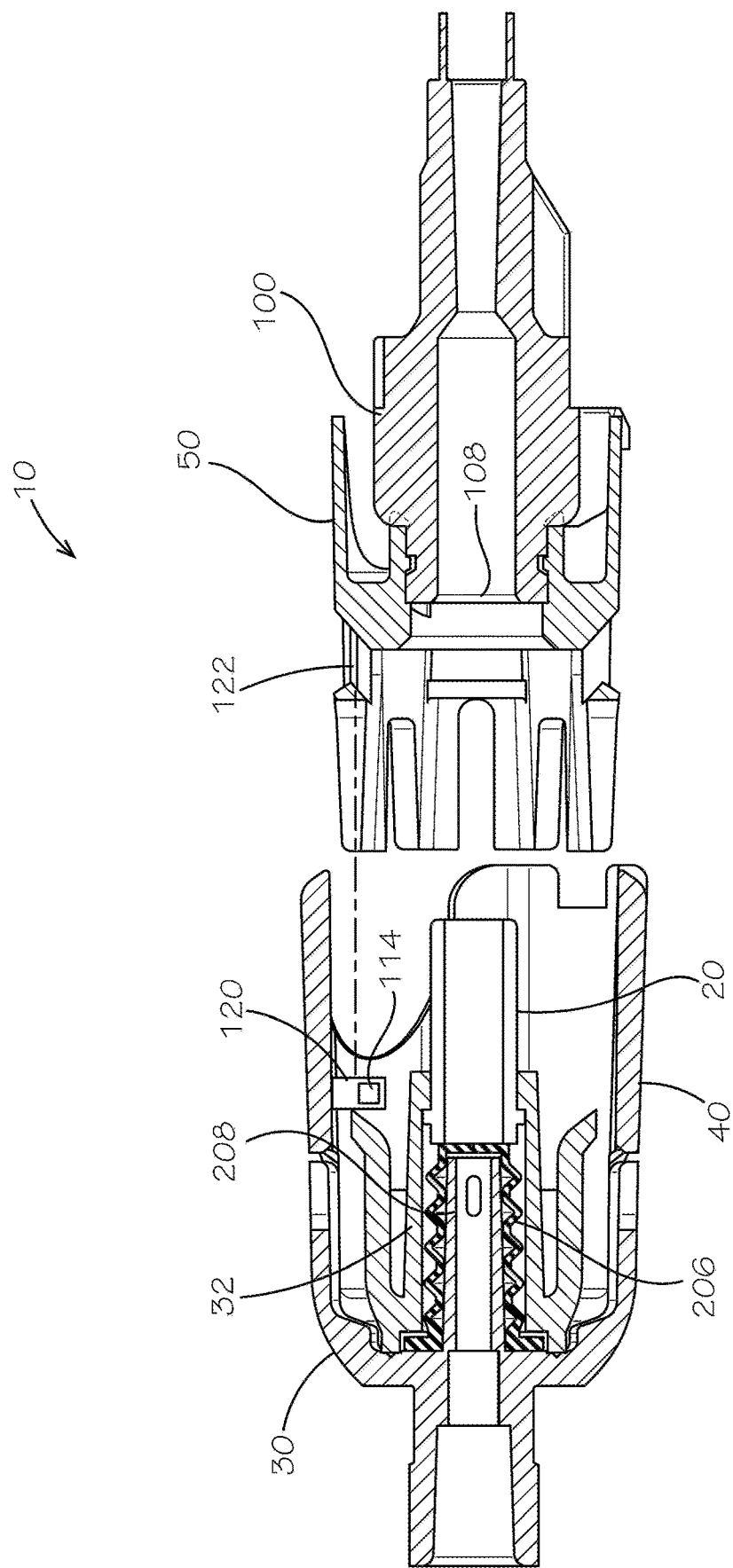
FIG. 14 illustrates a cross-sectional view of an embodiment of a breakaway connector apparatus including an axially-moveable cannula, a compressible sheath and a battery housing including a battery, and including a pull tab to activate the battery-powered electronic circuit.

Referring to FIG. 14, in some embodiments, breakaway connector 10 includes a housing 30 attached to a shell 40, and a breakaway component 50 is attached to a needle-free connector 100. Needle-free connector 100 includes a seal 108. An axially-moveable cannula 20 is positioned to translate axially in a channel 32 adjacent a valve including a compressible sheath 206 positioned on a hollow stem 208. When the needle-free connector 100 is secured to the breakaway component 50, the cannula 20 compresses the sheath 206, thereby opening the valve, and the cannula 20 also opens seal 108 on the needle-free connector 100. When a threshold tensile force is applied, the breakaway component 50, together with the needle-free connector remaining attached, separates from the shell 50 and housing 30, as shown in FIG. 14. Upon separation, cannula 20 translates axially away from housing 30, thereby closing the valve, and cannula 20 also separates from the needle-free connector 100, thereby closing seal 108.

Also, in some embodiments, a pull tab 122 is fixed to breakaway component 50 extending toward housing 30. Prior to separation, pull tab 122 resides in a battery housing 120 containing battery 114 in some embodiments separating the battery from contacting a battery terminal, thereby maintaining the battery in a zero discharge state disconnected from the electronic circuit for powering a visual and/or audio indicator. Upon separation, pull tab 122 slides out of battery housing 120, thereby allowing battery 114 to engage the electronic circuit onboard the device to provide power to the audio and/or visual indicators. As such, pull tab 122 operates as a mechanical switch to prevent battery 114 from contacting its battery terminal and powering the device prior to separation, but allowing battery 114 to contact its battery terminal to power the device following separation. As such, battery 114 may remain in place without discharging prior to separation of the device, which allows for a longer shelf life of the component without discharging the battery before it is needed to power the audio and/or visual indicators.

In other reverse configuration embodiments, such as shown in FIG. 13, where the electronics are housed on the breakaway component 50, pull tab 122 is positioned on the housing 30 or shell 40 projecting toward breakaway component 50, and pull tab disengages from a battery housing on the breakaway connector 50 upon separation. Thus, the shelf-life of the connector may be two years or greater due to the pull tab preventing contact between the battery and a corresponding terminal in the electric circuit until a separation event occurs.

In some embodiments, the present disclosure provides a breakaway connector device with only one valve, configured for attachment to a needle-free connector. By providing a device with only one valve, the apparatus may take advantage of the seal on the needle-free connecter to function as a patient-side valve in a separation event.

In further embodiments, the present disclosure provides a method of securing an intravenous line using the devices disclosed herein.

Thus, although there have been described particular embodiments of the present invention of new and useful devices and methods, it is not intended that such references be construed as limitations upon the scope of this invention except as set forth in the claims.

What is claimed is:

1. A breakaway connector device for attachment to a needle-free fitting having a seal, comprising:
   a housing including a channel;
   a breakaway component detachably secured to the housing and configured for attachment to the needle-free fitting;
   a valve; and
   an axially moveable cannula disposed in the channel, the cannula including a first end and a second end,
   wherein the cannula is positioned to open the seal in the needle-free fitting at the first end when the needle-free fitting is attached to the breakaway component,
   wherein the cannula is configured to open the valve at the second end when the needle-free fitting is attached to the breakaway component,
   wherein the breakaway component is configured to detach from the housing when a threshold tensile force is applied to the device, and
   wherein the cannula is configured to close both the valve and the seal on the needle-free fitting when the breakaway component detaches from the housing.

2. The device of claim 1, further comprising a luer socket defined on the breakaway component.

3. The device of claim 2, further comprising a shell disposed on the housing, the shell comprising a securing arm.

4. The device of claim 3, further comprising a ramp disposed on the breakaway component and a ramp window defined adjacent the ramp.

5. The device of claim 4, wherein the securing arm extends into the ramp window and engages the ramp when the breakaway component is secured to the housing.

6. The device of claim 5, wherein the securing arm is configured to disengage from the ramp when the breakaway component detaches from the housing.

7. The device of claim 6, further comprising a block wall disposed on the breakaway component.

8. The device of claim 7, wherein the securing arm is positioned to contact the block wall thereby preventing reconnection of the breakaway component with the device following detachment.

9. A breakaway connector apparatus for attachment to a needle-free fitting, comprising;
   a housing including a channel;
   a shell disposed on the housing;
   a breakaway component detachably secured to the shell, the breakaway component including a socket configured for engagement with the needle-free fitting; and
   only one valve disposed on the breakaway connector apparatus, wherein the valve is disposed in the channel, wherein the breakaway component is configured to detach from the shell when a threshold tensile force is applied to the apparatus.

10. The apparatus of claim 9, wherein the valve comprises a compressible sheath.

11. The apparatus of claim 9, wherein the valve comprises a duckbill valve.

12. The apparatus of claim 9, further comprising an axially-moveable cannula disposed in the housing.

13. The apparatus of claim 12, wherein the valve comprises a compressible sheath.

14. The apparatus of claim 9, further comprising a visual indicator on the breakaway connector apparatus.

15. The apparatus of claim 9, further comprising an audio indicator on the breakaway connector apparatus.

16. The apparatus of claim 9, further comprising a visual indicator, an audio indicator and a battery disposed on the breakaway connector apparatus.

17. The apparatus of claim 16, further comprising a pull tab, wherein the pull tab blocks contact between the battery and an electronic circuit and prevents the battery from powering the visual and audio indicators via the electronic circuit until the breakaway component separates from the shell.

\* \* \* \* \*